(12) United States Patent
Dupree et al.

(10) Patent No.: US 6,413,650 B1
(45) Date of Patent: Jul. 2, 2002

(54) METHOD FOR REPAIRING SUPERALLOY CASTINGS USING A METALLURGICALLY BONDED TAPERED PLUG

(75) Inventors: Paul Leonard Dupree, Scotia; Melvin Robert Jackson, Niskayuna, both of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/571,438

(22) Filed: May 15, 2000

Related U.S. Application Data

(62) Division of application No. 09/366,303, filed on Aug. 2, 1999, now Pat. No. 6,199,746.

(51) Int. Cl.[7] .............................. B23P 6/04; F01D 5/00
(52) U.S. Cl. ..................... 428/579; 428/577; 428/596; 428/582; 428/637
(58) Field of Search ................................. 228/119, 121, 228/161; 164/3; 29/889.1, 402.07, 402.08; 428/596, 577, 579, 582, 583, 585, 599, 637

(56) References Cited

U.S. PATENT DOCUMENTS

| | | | | |
|---|---|---|---|---|
| 2,010,569 A | * | 8/1935 | Sitzler | 29/148 |
| 3,487,530 A | | 1/1970 | Ely | 29/402 |
| 3,626,568 A | * | 12/1971 | Silverstein et al. | 29/156.8 H |
| 3,768,147 A | * | 10/1973 | Berry et al. | 29/470.3 |
| 4,614,296 A | * | 9/1986 | Lesgourgues | 228/194 |
| 4,953,777 A | * | 9/1990 | Griffith et al. | 228/119 |
| 4,969,905 A | * | 11/1990 | Pappas et al. | 623/16 |
| 5,067,234 A | * | 11/1991 | Fraser | 29/889.1 |
| 5,111,570 A | * | 5/1992 | Baumgarten et al. | 29/402.13 |
| 5,732,467 A | * | 3/1998 | White et al. | 29/889.1 |

FOREIGN PATENT DOCUMENTS

| | | | |
|---|---|---|---|
| JP | 09-168927 | * | 6/1997 |
| WO | WO 97/21516 | * | 6/1997 |

* cited by examiner

*Primary Examiner*—John J. Zimmerman
(74) *Attorney, Agent, or Firm*—Robert P. Santandrea; Noreen C. Johnson

(57) ABSTRACT

A method of repairing cracks, imperfections, and the like in a cast article. A frusto-conical aperture is created in the article in the location of the crack or imperfection. A mating tapered plug is prepared such that the tapered plug can fit into the aperture so that the sloped side walls of the tapered plug evenly and unilaterally rest on frusto-conical sides of the aperture. The tapered plug is disposed into the aperture, and bonding material is applied between the surfaces of the tapered plug and the aperture, before or after insertion of the tapered plug into the aperture. The article is thereafter heated such that the bonding material joins the surfaces of the tapered plug and the aperture. The outer end of the tapered plug thereafter is polished so that such outer end is approximately level with the article's outer side in a refinement of the invention, the plug member may be pushed into the aperture such that a controlled interference fit is produced.

22 Claims, 5 Drawing Sheets

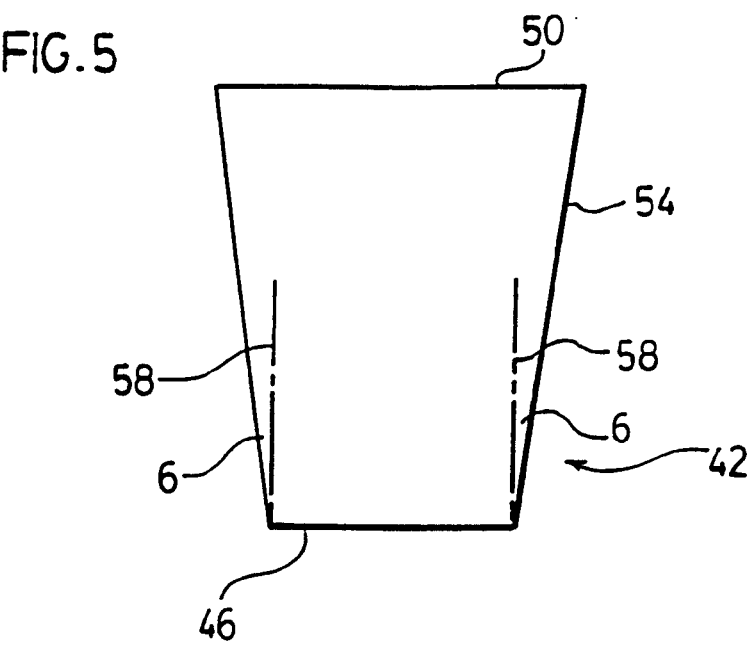
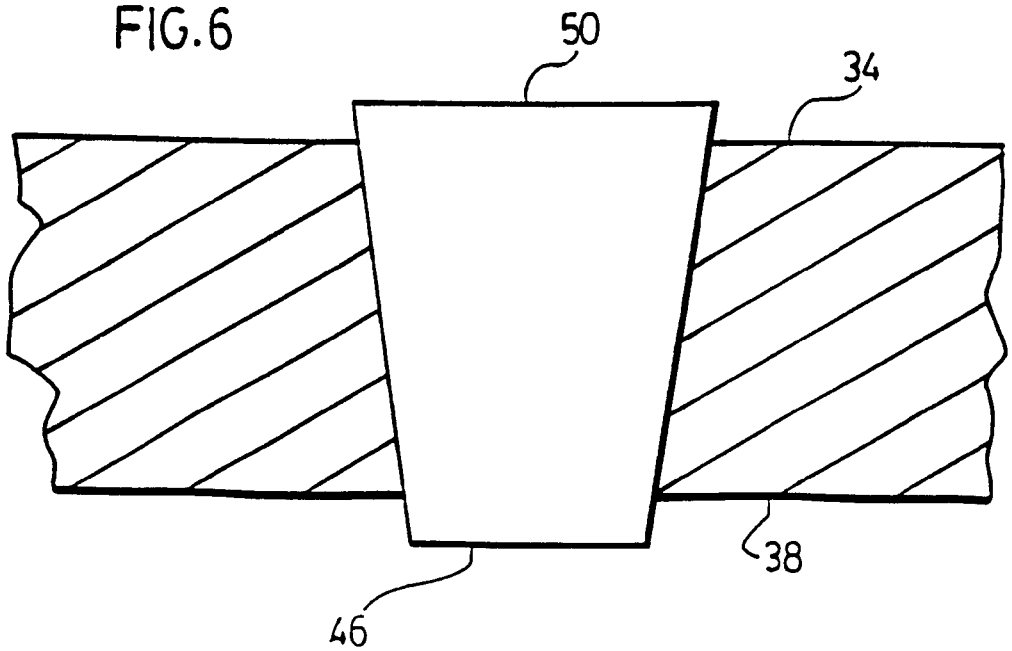

METHOD FOR REPAIRING SUPERALLOY CASTINGS USING A METALLURGICALLY BONDED TAPERED PLUG

This application is a division of application Ser. No. 09/366,303, filed Aug. 2, 1999, now U.S. Pat. No. 6,199,746 B1, which is hereby incorporated by reference in its entirety.

BACKGROUND OF THE INVENTION

The invention relates to the field of repair of a cast article, and more particularly to repair of a cast article having imperfections.

Certain articles, such as airfoils for the power turbine sections of gas turbines, are constructed of superalloys. Due to the extreme temperatures and stresses to which such cast superalloy articles such as, airfoils, are exposed, imperfections in cast articles can have serious consequences. In the case of an airfoil, the control of the airfoil wall's thickness, when an airfoil is cast, is critical to the strength and life of the airfoil.

More particularly, turbine components such as turbine airfoils are typically cast as hollow structures with complex cooling passages inside. The complex cooling passages are desired because the temperatures of the hot combustion gases directed at the airfoil during operation are at or above the melting temperature of the superalloy composition. The cooling medium may comprise air or steam. In the case of steam, such steam will typically be under pressure higher than cooling air pressure. The airfoil design is sensitive to airfoil wall thickness control because of these factors. Insufficient thickness results in significant creep damage due to high local stresses in areas of reduced thickness (i.e. cross-sectional area), while excessive wall thickness results in fatigue damage due to insufficient cooling of the exterior. An about 0.08" nominal airfoil thickness is predicted to result in an airfoil achieving its design life if actual thickness can be maintained to within about 0.02" of the nominal thickness.

The directional casting process for superalloy components, such as airfoils, typically utilizes ceramic "bumpers" on core surfaces or mold surfaces. For a nominal cast wall thickness of about 0.08"+/−0.2", ceramic bumpers of about 0.06" in height help control wall thickness by the geometric constraints provided in the form of the ceramic bumpers. A large number of bumpers on each casting reduces the likelihood of distortion of the ceramic molds and cores.

After the article is directionally cast, the ceramic bumpers are removed. The wall of the article will be thin wherever there had been ceramic bumpers. In addition, if the mold and the core had been in contact, there would be a small hole in the article at a contact point, and a corresponding thicker area on the other side of the article. Because variations in wall thickness beyond the design specification of about 0.08"+/− about 0.02" may result in early failure of the airfoil, restoration of wall thickness is needed.

The restoration of wall thickness is complicated by the article geometry where, for example, an airfoil. At every airfoil bumper location there is a unique combination of inner surface and outer surface contours to the airfoil wall exist. In addition, due to variations in wall thickness within the design specification, no two airfoils will have the same wall thickness profile around the airfoil perimeter or along the airfoil length. An airfoil design can, for example, allow for filler material to project into the airfoil cooling cavity up to about 0.02" before such filler material results in any detrimental perturbation of the coolant flow. Because the coolant can comprise steam, the inner contour at each repair should be reasonably smooth so as not to set up a site for crevice corrosion. Outer surface contours are less of a concern, since the outer surface is easily available for hand blending of the filler material back to the airfoil contour.

In addition to a need to satisfactorily repair articles due to dimensional imperfections resulting from the casting process, a further need to repair articles whereby cracks may have developed at a location on the article during the casting process exists. As well, cracks can develop in airfoils after they have been in service for a period of time. Up to now, once a crack or imperfection of sufficient size has been detected, the airfoil would be immediately replaced. If the crack or imperfection could be repaired in such a way that the airfoil could thereafter withstand the extreme operating conditions in a turbine, then the expense of replacing the cracked airfoil with a new airfoil can be avoided.

In addition to dimensional concerns for the repairing of an airfoil wall at weakened locations, the strength of the airfoil should be maintained. Steam can be a cooling medium for an airfoil, and the steam injected into the cooling passages under pressure creates a pressure vessel effect therein. A repair should be able to withstand the interior pressure and be leak-tight, and also be almost as strong as the surrounding directional material in terms of strength and resistance to creep and fatigue.

Airfoils are typically formed of superalloys that can have directionally-oriented microstructures to satisfy the mechanical strength demands for creep resistance or fatigue resistance to achieve a satisfactory design life. Directionally-oriented microstructures can be produced using directional solidification processes, which result in either elongated polycrystalline grains or single crystals. Directionally oriented microstructures may be problematic to the repair of dimensional imperfections and cracks therein, since the repaired area should have a similarly oriented microstructure of uniform strength.

Accordingly, a need exists for a method to repair a cast article having an area of imperfection in the form of a non-dimensional wall thickness. A further need exists for a method to repair a cast article having an area of imperfection, in which the repaired article in the repaired area of imperfection is capable of withstanding stresses which are substantially equal to, or a substantial amount of, the stresses which would previously be capable of being withstood in absence of such imperfection.

Further, a need exists for a method to repair a cast article, such as a hollow airfoil, having an area of imperfection or a crack, wherein the airfoil, at the repaired area of imperfection or crack, is capable of withstanding interior pressure. Still further, a need exists for a method to repair a cast article, such as a hollow airfoil, having a directionally oriented microstructure and growth axis and an area of imperfection, in which such airfoil, in the repaired area of imperfection, has an identically aligned growth axis that permits the repaired area to withstand stresses a substantial portion of those previously capable of being withstood by the airfoil.

SUMMARY OF THE INVENTION

Accordingly, in one aspect of the invention, a method of repairing a cast article having an area of imperfection, comprises the steps of forming an aperture in the cast article in the area of imperfection, the aperture having sloped side walls, forming a plug member, the plug member on an external periphery thereof provided with similarly sloped side walls, adapted to substantially abut a portion of the sloped side walls of the aperture when the plug member is disposed (inserted) therein, and inserting the plug member into the aperture. A bonding material is applied between the plug member side walls and aperture side walls, either before or after insertion of the plug member into the aperture. Lastly, the article is heated the that the bonding material bonds the sloped side walls of the plug member to the sloped side walls of the aperture.

Using a method, as embodied by the invention, an imperfection within a cast article, such as a wall of non-dimensional thickness, or a crack, may be effectively drilled out by the formation of an aperture in the place of the imperfection. By providing an aperture with sloped side walls, a plug member with similarly sloped side walls adapted to abut a portion of the sloped side walls of the aperture permits the plug member when disposed into the aperture to substantially and evenly overlie a portion of the sloped walls of the aperture. This feature aids the subsequent bonding step, since the tapered side walls, create a greater surface area for bonding than would otherwise be the case if the side walls of the aperture were non-tapered and perpendicular to the plane of the article. The feature also allows the plug to sit as close to and overlie the tapered surface to which it will be bonded without having to increase dimensional tolerances and introducing an undesirable gap, which would otherwise be the case if there were no tapered side walls and the plug member had to be machined slightly under-dimension to allow insertion into the aperture.

In another aspect of the invention, a turbine airfoil machining process produces a surface roughness, for example about 0.002". Therefore, two mating machined surfaces in contact at mutual high spots can have locally variable widths in the gaps between their surfaces as wide as about 0.0004". To fill a gap of about 0.0004" however, a right cylindrical plug would have to be at least about 0.0004" larger than the aperture, and still be capable of insertion. Pre-shrinkage of the right-cylindrical plug member by pre-cooling may not, depending on the size of the plug member, be sufficient to reduce the size of the plug member to allow interference-free insertion into a right cylindrical aperture.

In cases where pre-shrinkage is not sufficient, the force necessarily involved in pushing a right-cylindrical plug member into a right cylindrical aperture, and the difficulty in aligning the over-dimensioned plug in the aperture can cause damage to the surfaces of both the plug or the aperture. The damage can comprise undesirable scratches or micro-cracks, which could act as crack initiation sites and propagate under the inherent ambient stresses and lead to failure. The damage can also cause undesirable recrystallization upon subsequent heat. Advantageously, a method, as embodied by the invention, for forming an aperture and a plug member provides each having similarly sloped walls, the plug member may be disposed into the aperture and the sides thereof will mutually overlie and evenly abut the sloped sides of the aperture without needing to be forced into the aperture.

In another aspect of the invention, the sloped walls of the aperture and plug member allow an interference fit to be created and maintained between the sloped walls of the plug member and the aperture when the plug member is disposed in the aperture. This interference fit is created without pre-cooling of the plug member and without the difficulties inserting an oversized plug in an undersized aperture. The created interference eliminates gaps which may exist due to surface irregularities in their respective surfaces as wide as about 0.0004". The interference fit also increases the bonding of the plug member to the aperture, and increases the structural integrity of the bond.

In a yet further aspect of the method of the invention, the method comprises inserting the plug member into the aperture, applying a force to the plug member to cause an interference fit between the sloped walls of the tapered plug and sloped walls of the aperture. This method allows the elimination of gaps due to surface roughness, and avoids difficulties that would be encountered in attempting to insert an over-dimensioned right cylindrical plug to a right-cylindrical aperture of lesser dimensions for an interference fit. The taper of each of the plug and aperture is sufficiently small so when forcefully inserted in the aperture, the interference fit will allow the plug member to remain therein.

Where a cast article to be repaired comprises a directionally-oriented microstructure and growth axis, the plug member should be capable of being received in the aperture. Thus, the plug member growth axis is oriented and aligned with the cast article growth axis. Thus, the plug member and aperture each possess mating engagement means, which matingly engage and allow insertion of the plug member within the aperture upon alignment of the plug member growth axis with the article growth axis. A step of inserting the plug member into the aperture comprises aligning the mating engagement means on the plug member with the corresponding mating engagement means of the aperture, and inserting the plug member in the aperture.

In another aspect of the invention, a plug member for repair of imperfections in a cast article comprises a superalloy composition and directionally-oriented microstructure. The plug member comprises a substantially identical superalloy composition and a directionally-oriented microstructure and growth axis. The plug member is provided with tapered side wall surfaces extending about its periphery and tapered to allow the plug member, when forcibly inserted within an aperture, to remain in an interference fit within the aperture. The plug member further possesses mating engagement means to matingly engage and allow insertion of the plug within the aperture when the growth axis of such plug member is aligned with the growth axis of the cast article being repaired.

The plug member of the present invention may further comprise bonding material, such as a braze alloy or other bonding material, applied to its tapered surfaces. The bonding material readies it for bonding when placed on an aperture and subsequently heated.

BRIEF DESCRIPTION OF THE DRAWINGS

The present invention will now be described, by way of example only, with reference to embodiments shown in the attached drawings, in which:

FIG. 5 is an enlarged side elevation view of a plug member for repair in which the plug member comprises sloped side walls adapted to abut similarly sloped side walls of the aperture when inserted in the aperture;

FIG. 6 is an enlarged cross-sectional view of the plug member inserted in the created aperture;

DESCRIPTION OF THE INVENTION

Figure 1:
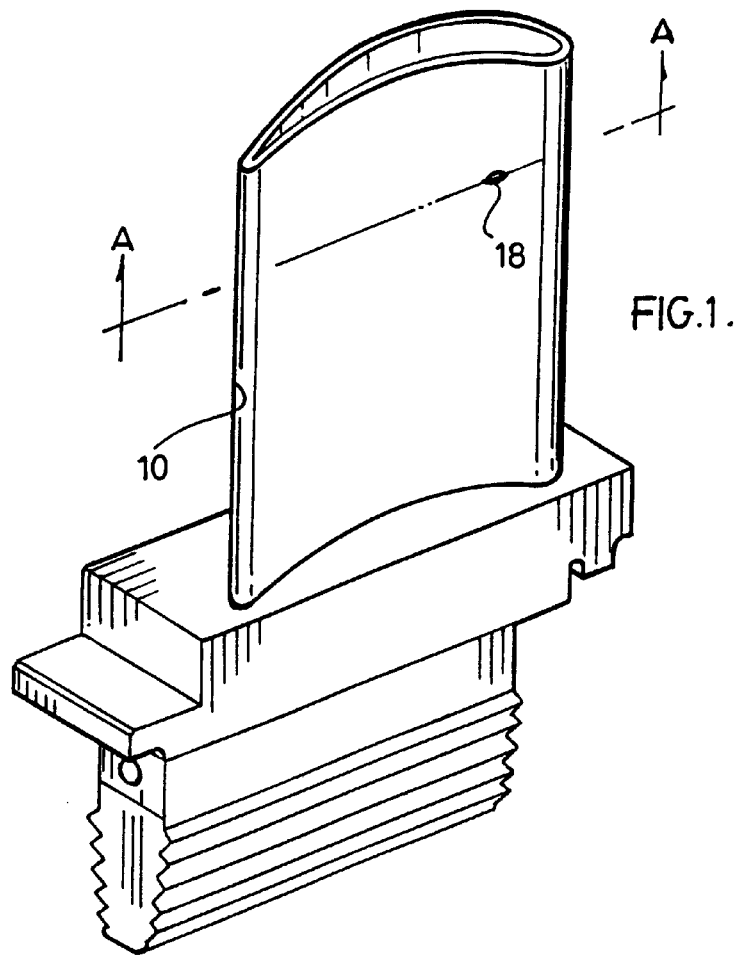
FIG. 1 is a perspective view of a cast article namely a hollow turbine airfoil of superalloy composition, having an imperfection in the exterior surface thereof.
Figure 2:
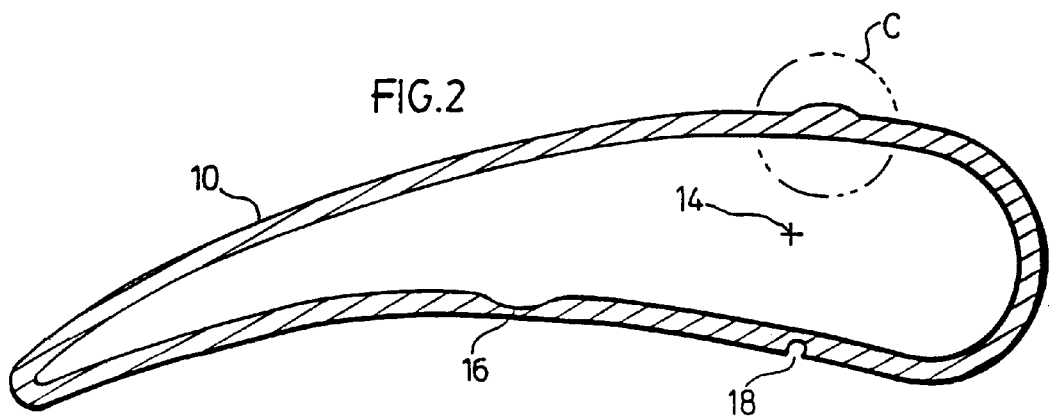
FIG. 2 is an enlarged cross-section of the hollow turbine airfoil illustrated in FIG. 1, taken along plan A—A.

A casting process that results in an article requiring repair in accordance with the present invention will be discussed with reference to the Figures. FIG. 1 illustrates a cast article, such as an airfoil 10, for use in a gas turbine. The airfoil 10 is typically formed of a superalloy composition having a directional or single crystal microstructure. The growth axis 14 of the directional microstructure of the airfoil 10 is illustrated in FIG. 2, in the direction of arrows B—B in FIG. 7.

The thickness for the walls according to a design specification of an airfoil 10 can be, for example, about 0.08", +/− about 0.02". The directional microstructure and the design thickness satisfy the mechanical demands for the creep resistance and fatigue resistance necessary to achieve a desired airfoil design life. A directional microstructure may be produced by directional solidification during casting the airfoil 10 along the growth axis 14.

The casting process used to satisfy the requirements for wall control utilizes ceramic "bumpers" within core surfaces or mold surfaces. For example, a ceramic bumper used in the casting of the airfoil can be about 0.06" in height to control wall thickness. After the article has been cast, the ceramic bumpers are removed. Locations where ceramic bumpers had been located and removed, are identified by numeral 16 in FIG. 2. At other locations where the mold and the core may have been in direct contact, or a ceramic bumper and the mold may have been in direct contact a small hole 18 in the article's wall exists (FIG. 2). Where this hole occurs, there will also be a corresponding thicker area ("C") on the opposite side of the airfoil 10 (FIG. 2).

In a repair process, as embodied by the invention, areas of reduced thickness in an airfoil's walls are determined. An aperture 22 can be made at each such area by drilling out the wall material (see FIGS. 3 and 4). The aperture 22 is defined to insert a plug member 42 (FIG. 5) at each area 16 and hole 18 to have sufficient wall thickness, for example, a thickness of about 0.08"+/− about 0.02".

Figure 3:
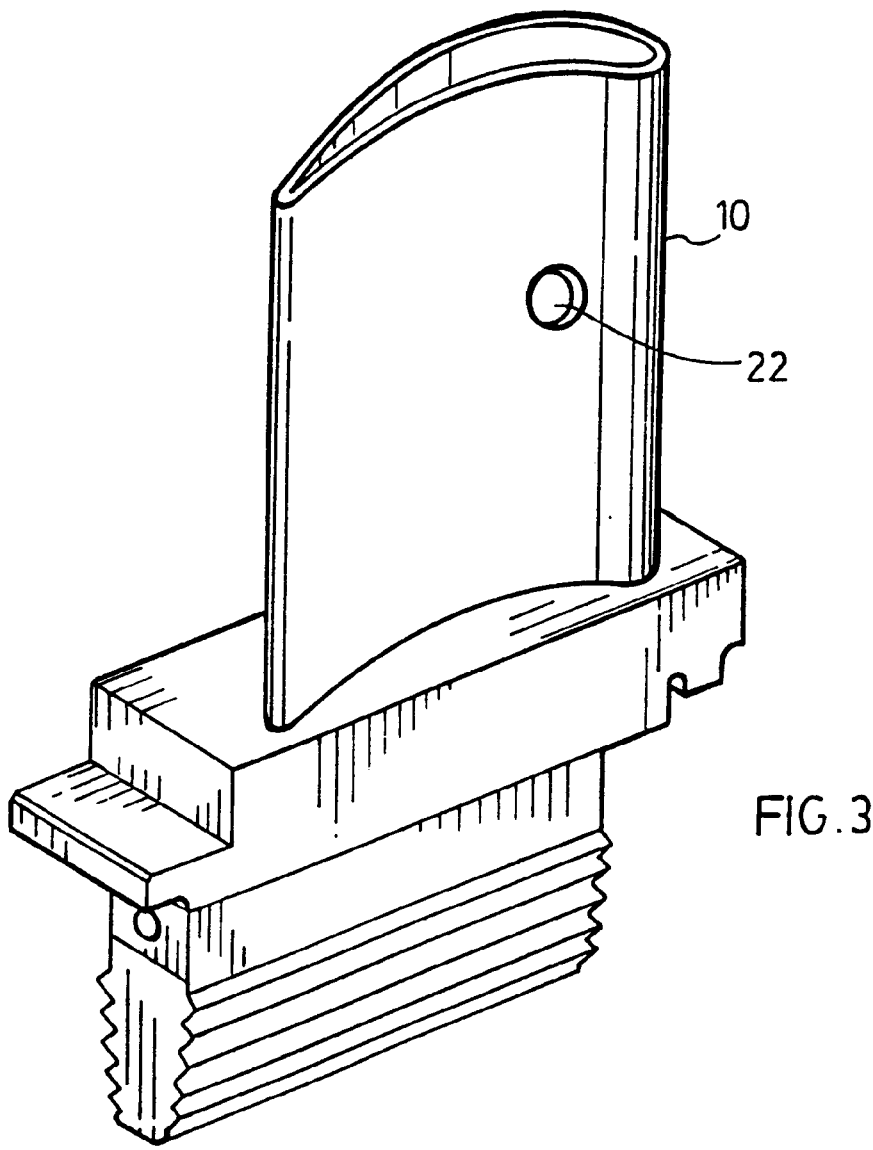
FIG. 3 is a perspective view of the hollow turbine airfoil of FIG. 1 having the imperfection drilled out by way of creation of an aperture having sloped walls in place of the imperfection.
Figure 7:
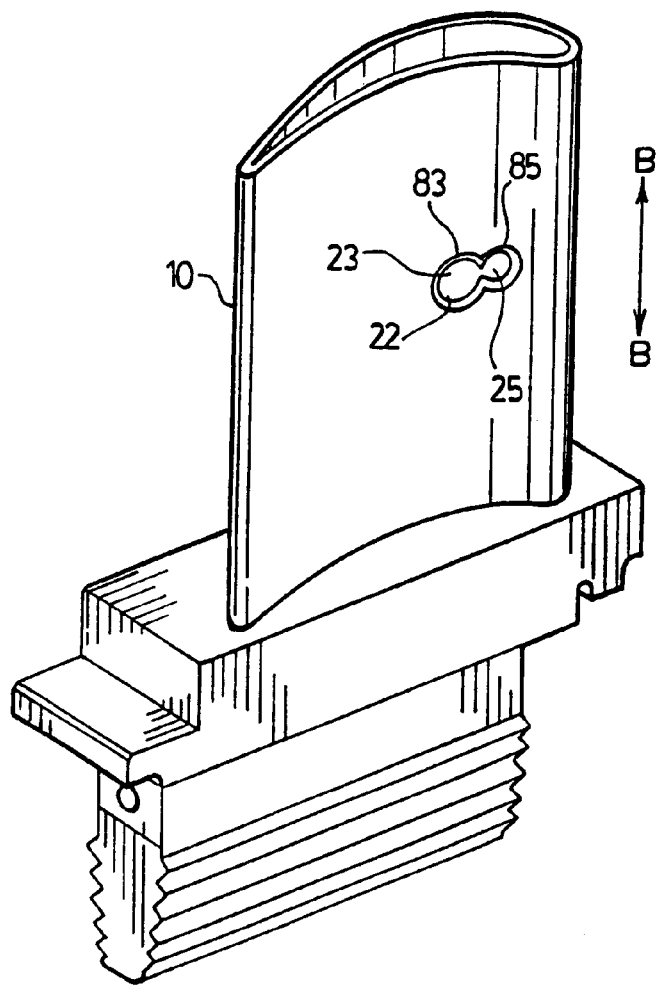
FIG. 7 is a perspective view of a hollow, cast turbine airfoil, of superalloy composition having a directionally solidified microstructure in the direction B—B, further having a curvilinear aperture created in the airfoil exterior to thereby remove an imperfection in the exterior of the airfoil.

Repair of an airfoil 10 having a superalloy composition can arise in circumstances other than those related to a casting process. For example, an airfoil that has been in service can develop a crack. To repair a crack, an aperture 22 as made in the airfoil, as illustrated in FIGS. 3 and 7. The aperture 22 is centered on the crack. A tapered plug 42, 73 (FIGS. 5 and 8) is formed having dimensions to be received in the aperture 22. After the plug member 42, 73 is brazed to the aperture 22 by application of a bonding material and a subsequent heat treatment, the repaired article 10 may be returned to service.

Figure 4:
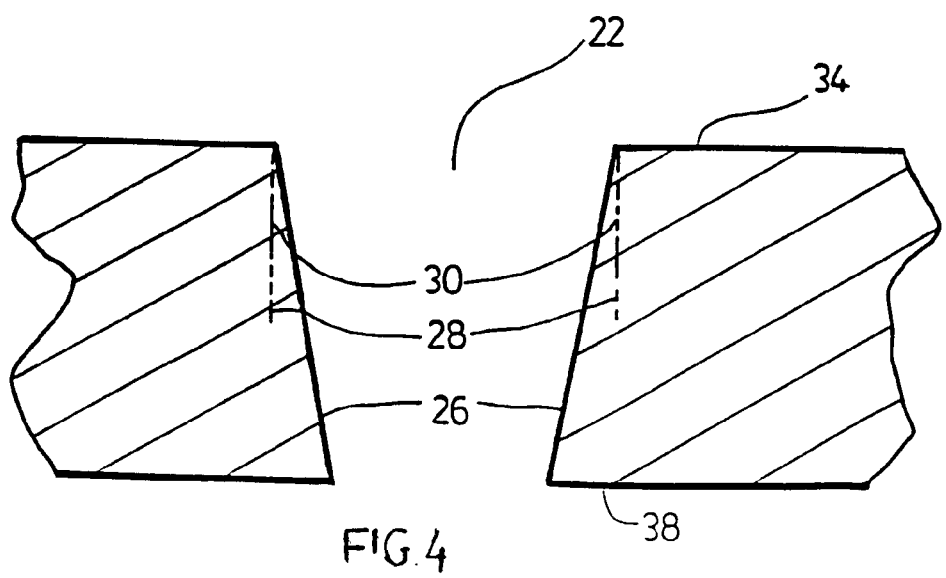
FIG. 4 is an enlarged cross-sectional view of the aperture illustrated in FIG. 3.

In FIG. 4, the aperture 22 is prepared having sloped sides and an inner surface 26. The intersection of the aperture inner surface 26 and an orthogonal line 28 forms a first included angle 30 for the aperture taper. An inner side 38 of the article is also illustrated in FIG. 4. The aperture 22 can be formed with an area of reduced wall thickness after the location of reduced wall thickness has been determined. The aperture 22 extends from the article's outer side 34 to the article's inner side 38.

FIG. 5 illustrates a tapered plug member 42 in side elevation. The plug 42 has an inner end 46, an outer end 50, and a plug surface 54. The intersection of the plug surface 54 and an orthogonal line 58 at the inner end 46 forms a second included angle 62. The first included angle 30 and second included angle 62 are substantially equal within a design specification. The aperture 22 defines a frusto-conical shape, when viewed in longitudinal section, by virtue of the first included angle 30 and the second included angle 62. The larger end of the aperture 22 is disposed adjacent to the outer side 34. The tapered plug 42 also has a frusto-conical shape, in side elevation, so the tapered plug 42 can be received in the aperture 22.

FIG. 6 illustrates a side view of the tapered plug 42 after insertion into aperture 22. The inner end 46 of the tapered plug 42 extends beyond the inner side 38 of the article, and the outer end 50 extends beyond the outer side 34. The inner end 46 and the outer end 50 need not extend beyond the inner side 38 and the outer side 34, respectively, after insertion but may in alternative configurations. For example, an airfoil design specification can allow a tapered plug 42 to extend up to approximately about 0.02" beyond the airfoil's inner side 38. A protrusion by the tapered plug 42 of more than about 0.02" can result in perturbation of the flow of coolant within the airfoil 10, that may set up a site for crevice corrosion. Outer side contours are less of a concern, as the outer end 50 of a tapered plug 42, can be polished to match to the contour of the outer side 34.

With reference to FIG. 6, the plug surface 54 of plug member 42 lies in abutting contact with inner surface 26 of the aperture 22, due to identical tapers of the plug surface 54 and the inner surfaces of the aperture 22. The local diameter of a taper of each of the plug 42 and aperture 22 is a direct function of length. Thus, pushing the tapered plug 42 into an aperture 22 can result in an increase in local diameter, thus defining an interference fit. The repair process, as embodied by the invention may include subsequent heat treatment that can relax strains in the contacting surfaces. Pushing the tapered plug 42 with a relatively large amount force can cause sufficient interference that no gaps remain between the contacting surfaces. Over-application of an insertion force on the tapered plug 42 can result in introduction of sufficient stresses that may introduce micro-cracks in the exterior walls of the airfoil proximate the aperture 22. Accordingly, the amount of force used to ensure that the tapered plug 42 is securely inserted into the aperture 22 is sufficient producing an interference fit best not sufficient to introduce cracking.

If the taper of both the plug member 42 and aperture 22 is shallow enough, meaning that the first included angle 30 and the second included angle 62 are sufficiently small, a high degree of accuracy the nominal interference can be achieved by measuring the length of the tapered plug 42 to be inserted into the aperture 22. A sufficiently shallow taper can be self-locking, that is, the frictional forces caused by the aperture inner surface 26 and plug surface 54 being pushed together to hold the tapered plug 42 in place, and exceed compressive forces tending to expel the tapered plug 42 elastically. For example, for nickel-based superalloys, a shallow taper of about 1.20° has been found to be self-locking and further to produce an interference fit of approximately about 0.0012 inches.

The steps in the repair method depicted in FIGS. 1–6 comprise producing a tapered plug 42 and an aperture 22 of equivalent tapers using common machining practice. After the aperture 22 and tapered plug 42 have been created, the length of the aperture 22, for example the thickness of the wall of the article to be repaired, is measured. The tapered plug 42 is inserted into the aperture 22, using minimal pressure to avoid locking.

After measuring the length of the tapered plug 42 extends beyond the article's outer side 34 when the tapered plug 42 is inserted, the tapered plug 42 can be removed from the aperture 22. The tapered plug 42 is then cut to length for accurate placement in the aperture 22 so portions of the tapered plug 42 at the inner end 46 and outer end 50 can be ground or cut-off. Thus the inner end 46 can be at approximately the same level as the article's inner side 38, and the outer end 50 can be at approximately the same level as the article's outer side 34, once the tapered plug 42 has been inserted again into aperture 22.

If an inner end 46 of a tapered plug 42 projects beyond the article's inner side 38 or the outer end 50 is to project beyond the article's outer side 34, or both, then the tapered plug 42 can be cut for any desired degree of interference. In practice, the outer end 50 of the tapered plug 42 extends beyond the article's outer side 34 a relatively small amount. A local depression does not result after insertion, due to the application of force to the outer end 50 of the tapered plug 42 during insertion.

Bonding material, such as, at least one of boronized surface treatments, thin sputtered layers of commercial or proprietary braze alloys, a nickel layer, and a layer consisting of soft materials, such as aluminum, cobalt, and platinum that will not result in undesirable metallurgical reactions and some combination thereof can be applied between the aperture inner surface 26 and the tapered plug surface 54 the bonding material can be applied before or after insertion of the tapered plug 42 into the aperture 22. For example, the tapered plug surface 54 can be coated with bonding material prior to insertion into the aperture 22. Following insertion of the tapered plug 42, the article 10 can be heated such that the tapered plug surface 54 is bonded to the aperture inner surface 26.

In an other embodiment as embodied by the invention, the bonding material, for example a braze material, can be added in any space between the article 10 outer side 34, the aperture inner surface 26, and the tapered plug surface 54. The entire assembly is then heat. The braze material move s into vacant spaces therebetween by means of capillary action.

An alternative embodiment if the article comprises for directionally aligned microstructures including as single crystal and directionally solidified superalloy, microstructures the tapered plug 42 can be prepared from a similar directional material. The matched materials minimize the amount of grain boundary length created in the plug repair process.

With respect to the method illustrated in FIGS. 7–10, the method is useful for the repair of cast articles having directionally solidified microstructures. In the method, a curvilinear aperture 22 is prepared in which the aperture comprises a pair of intersecting through-holes 23, 25. Each hole has different major diameters. The holes 23, 25 are provided sloping (tapered) side walls 83, 85 to give each through-hole 23, 25 a frusto-conical configuration and the advantages as described above.

Figure 8:
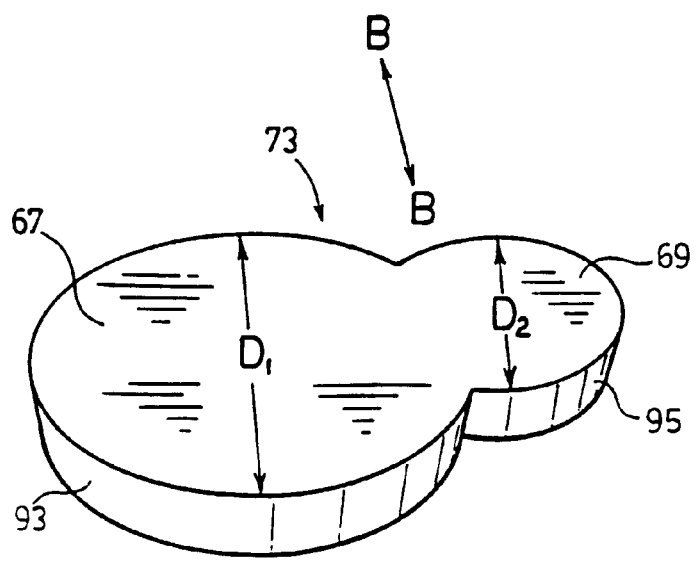
FIG. 8 is a curvilinear tapered plug member, having sloped walls and having a directionally solidified microstructure in the direction B—B, which is alignable with the directionally solidified microstructure of the airfoil illustrated in FIG. 7.
Figure 9:
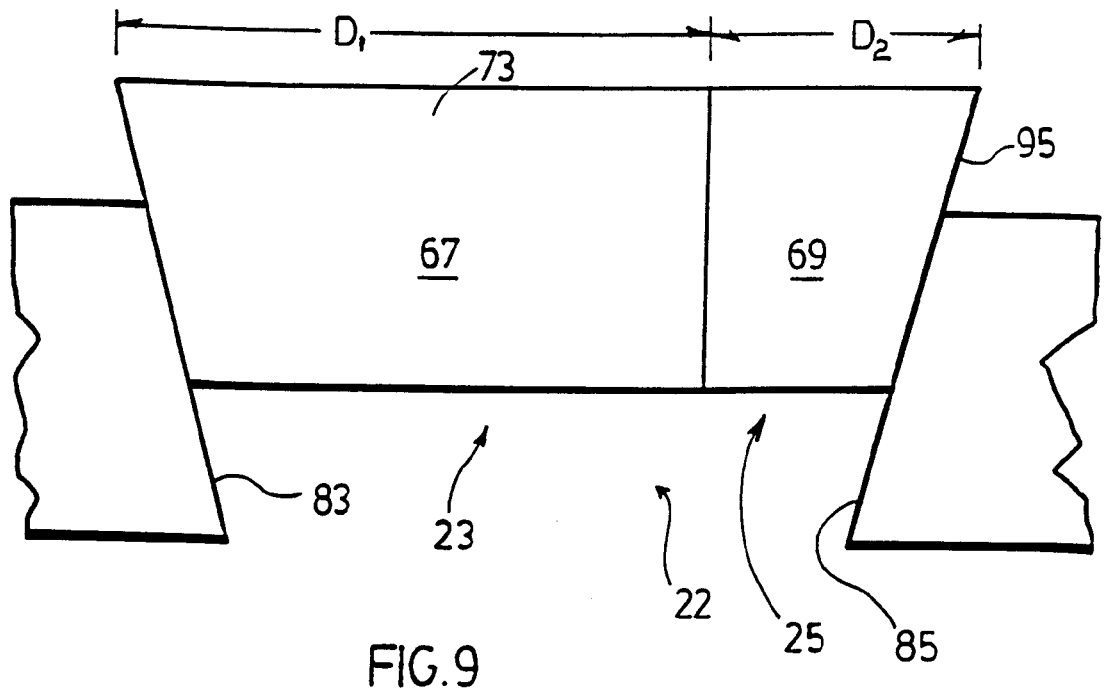
FIG. 9 is an enlarged cross-sectional view of the curvilinear tapered plug member of FIG. 8 being inserted into the curvilinear aperture in the airfoil illustrated in FIG. 7.
Figure 10:
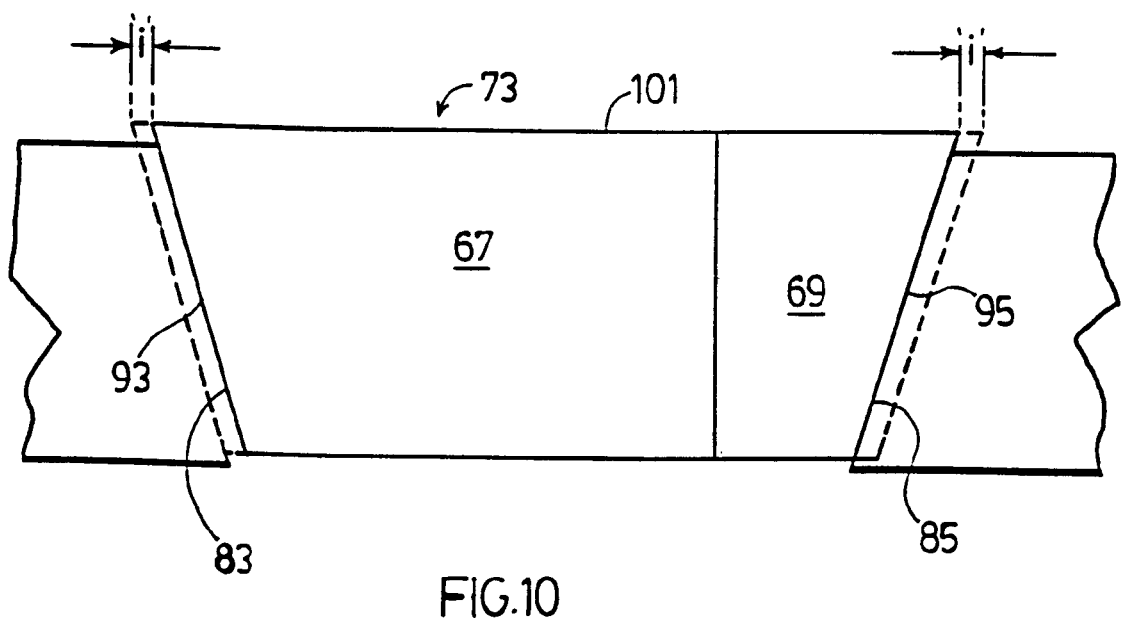
FIG. 10 is an enlarged cross-sectional view of the curvilinear tapered plug member of FIG. 8 inserted into the curvilinear aperture in the airfoil of illustrated FIG. 7, so as to create an interference fit.

A mating plug member 73 is formed (FIG. 8). The plug member 73 comprises two half members 67, 69 each of which are provided with sloping side walls 93, 95. Each side wall 93, 95 comprises a taper substantially equal to that of side walls 83, 85, to thereby allow mutual overlying relation when plug member 73 is inserted in aperture 22. The two half members 67, 69 each comprise different major diameter $D_1$ and $D_2$ and provide mating engagement means. The plug member 73 may only be inserted into aperture 22 in one orientation. The plug member 73 has a directionally oriented microstructure, as illustrated in direction of arrows B—B (FIG. 8), and the oriented microstructure will be closely aligned with the directional microstructure of the airfoil 10 (directional arrows B—B in FIG. 7).

Prior to insertion of the plug member 73 into aperture 22 (FIG. 7), the tapered side walls 93, 95 of plug member 73 may be coated with a bonding material, for example a braze alloy material may be applied after insertion of plug member 73 into aperture 22 around the periphery of such aperture 22. The bronze alloy material will flow into the plug member and aperture interface after heating by capillary action. Thereafter, the airfoil 10 with plug member 73 therein is heated to bond the sloped wall surfaces 93, 95 to the sloped walls 83, 85. In a preferred embodiment of the method of the present invention (particularly suited to where plug surface 54 of plug member 42 and/or aperture inner surface 26 are first coated with bonding material prior to insertion of plug member 42 into aperture 22). Thereafter, insertion of the plug member 73 is inserted into aperture 22, and a force is applied to the exterior surface 101 of plug member 73 (see FIG. 10), so as to forcibly insert plug member 48 into aperture 22 and cause an interference fit "i"(see FIG. 10) between the half members 67, 69 of plug member 73 and the through-holes 23, 25 that comprise aperture 22. The interference fit may be pre-determined in the manner previously described. Subsequent heat treatment may be used before, after, or during the bonding step so as to effect stress relief.

EXAMPLE

An aperture 22 of 0.15 inches diameter on the outer wall 34 of a turbine blade 10 is created, having side walls 26 and an included angle 30 of 1.2°, wherein the wall thickness is about 0.08 inches plus or minus about 0.02 inches (See FIG. 4). A plug member 50, having similarly sloped side walls 54 of 1.20° (see included angle 62 of FIG. 5) is prepared, and is uniformly coated with commercially braze alloy. Plug 42 is placed into aperture 22, so as to rest against side walls 26 of aperture 22 (See FIG. 4). Plug member 42 is thereafter pushed a translational distance of about 0.50 inches into aperture 22, creating about 0.0012 inch interference (i.e. about 0.050 xtan 1.2°). Due to the shallow taper, such interference is self-locking. The plug member 42 is thereafter heated to allow the side walls 54 thereof to be brazed to aperture side walls 26.

While various embodiments are described herein, it will be appreciated from the specification that various combinations of elements, variations or improvements therein may be made by those skilled in the art, and are within the scope of the invention.

We claim:

1. A mating plug member for filling an aperture in a cast article, said mating plug member comprising mating engagement means for matingly engaging and allowing insertion of said mating plug member within said aperture upon alignment of said mating plug member.

2. The mating plug member according to claim 1, wherein said mating plug member is formed from a superalloy.

3. The mating plug member according to claim 2, wherein said superalloy is a nickel-base superalloy.

4. The mating plug member according to claim 2, wherein said mating plug member has a directionally oriented microstructure and growth axis.

5. The mating plug member according to claim 1, wherein said engagement means comprises a first half member and a second half member, wherein each of said first and said second half member has sloping side walls, and wherein said first half member has a first diameter and said second half member has a second diameter different from said first diameter for matingly engaging and allowing insertion of said mating plug member within said aperture upon alignment of said mating plug member.

6. A cast article, said cast article comprising:
   a) at least one wall formed from a superalloy, said at least one wall having a thickness;
   b) an aperture extending through said wall, wherein said aperture has sloped side walls; and
   c) a mating plug member formed from a second superalloy and disposed in said aperture, said mating plug member comprising mating engagement means for matingly engaging and allowing insertion of said mating plug member within said aperture upon alignment of said mating plug member, and wherein said sloping side walls of said first half member and said second half member mutually overlie and evenly abut said sloped side walls of said aperture.

7. The cast article according to claim 6, wherein said superalloy and said second superalloy have substantially the same composition.

8. The cast article according to claim 7, wherein said superalloy is a nickel-base superalloy.

9. The cast article according to claim 7, wherein each of said at least one wall of said cast article and said mating plug member have a directionally oriented microstructure and growth axis, and wherein said directionally oriented microstructure and growth axis of said at least one wall is aligned with said directionally oriented microstructure and growth axis of said mating plug member when said mating plug member is inserted in said aperture.

10. The cast article according to claim 6, wherein said at least one wall of said cast article has a thickness of between about 0.06 inch and about 0.10 inch.

11. The cast article according to claim 6, wherein said aperture is located on a site previously in contact with a ceramic bumper.

12. The cast article according to claim 6, wherein an end of said mating plug member extends beyond one of an inner surface and an outer surface of said at least one wall.

13. The cast article according to claim 12, wherein an end of said mating plug member extends up to about 0.02 inch beyond one of an inner surface and an outer surface of said at least one wall.

14. The cast article according to claim 6, wherein an end of said mating plug member is substantially level with one of an inner surface and an outer surface of said at least one wall.

15. The cast article according to claim 6, wherein said plug member is joined to said at least one wall by self-locking fit between said sloped side walls of said aperture and said sloping side walls of said mating plug member.

16. The cast article according to claim 6, further including a bond material disposed between said sloped side walls of said aperture and said sloping side walls of said mating plug member, wherein said bond material joins said mating plug member to said at least one wall of said cast article.

17. The cast article according to claim 16, wherein said bond material comprises a boronized surface treatment.

18. The cast article according to claim 16, wherein said bond material comprises nickel.

19. The cast article according to claim 16, wherein said bond material comprises a braze.

20. The cast article according to claim 16, wherein said bond material comprises one of aluminum, cobalt, platinum, and combinations thereof.

21. The cast article according to claim 6, wherein said cast article is an airfoil.

22. The cast article according to claim 6, wherein said mating engagement means comprises a first half member and a second half member, wherein each of said first and said second half member has sloping side walls, and wherein said first half member has a first diameter and said second half member has a second diameter different from said first diameter for matingly engaging and allowing insertion of said mating plug member within said aperture upon alignment of said mating plug member.

* * * * *